May 12, 1959  B. E. HOUSE  2,886,141
BRAKE ACTUATING MECHANISM
Filed Jan. 4, 1955  2 Sheets-Sheet 1

INVENTOR
BRYAN E. HOUSE
BY Strauch, Nolan & Diggins
ATTORNEYS

May 12, 1959  B. E. HOUSE  2,886,141
BRAKE ACTUATING MECHANISM
Filed Jan. 4, 1955  2 Sheets-Sheet 2

Fig. 2
Fig. 3
Fig. 4
Fig. 5

INVENTOR
BRYAN E. HOUSE

BY Strauch, Nolan & Diggins
ATTORNEYS

United States Patent Office 2,886,141
Patented May 12, 1959

2,886,141

BRAKE ACTUATING MECHANISM

Bryan E. House, Ashtabula, Ohio, assignor to Rockwell-Standard Corporation, a corporation of Pennsylvania Application January 4, 1955, Serial No. 479,714

4 Claims. (Cl. 188—78)

This invention relates to improvements in vehicle brakes and has particular reference to brake cam actuators.

Brakes with hydraulic cylinder actuators which apply equal actuating force directly to both brake shoes or with floating head actuators which balance the actuating force applied directly to both brake shoes generally wear one shoe lining more quickly than the other as a result of the self-energizing effort of a conventional fixed-anchor axis brake shroe. This self-energizing effort of a conventional fixed-anchor axis brake shoe results from a wrapping up or self-applying action created by the rotating brake drum attempting to rotate the brake shoe toward its anchor pin. This creates pressure between the brake drum and the brake shoe in addition to that transmitted to the brake shoe by the actuator. When the brake drum attempts to rotate the shoe away from its anchor pin, there is no such wrapping action and the only effective braking effort of the shoe results from the force supplied by the actuator. In this type of brake one or the other of the two shoes, dependent upon the direction of brake drum rotation, will have a self-energizing factor and, if primary drum rotation is in one direction and equal simultaneous wear is the optimum factor, the self-energizing force of a shoe plus the actuating force applied to that shoe should be equal to the actuating force applied to the other shoe. This would require a differential in the actuating forces applied to the two brake shoes.

If, however, as in the preferred embodiment of the invention, increased braking effort is the primary object, the differential in actuating forces can be so arranged that a greater than conventional relative actuating force is applied to the shoe normally subject to the self-energizing factor and increased advantage is taken of the self-energizing force for increasing the braking action. In the preferred embodiment of the invention herein disclosed the actuating force transmitted to the shoe normally subject to a self-energizing factor from primary drum rotation is approximately twice that transmitted the other shoe.

It is the primary object of this invention to provide a brake mechanism employing a novel mechanically simple and inexpensive shoe actuating mechanism for obtaining optimum braking pressures.

A further object of this invention is to provide an improved vehicle brake actuator and brake assembly in which the actuator applies more actuating force to the brake shoe subject to a self-energization factor during vehicle forward movement than to the other brake shoe.

A further object of the invention is to provide a novel brake shoe actuator mechanism wherein a cam operatively connected at spaced opposed points to the brake shoes is freely journalled on an operating eccentric.

Another object resides in the provision of a floating brake actuator which utilizes a dynamically balanced force couple to apply unequal yet predeterminedly proportioned actuating forces to the respective brake shoes.

A further object is to provide a floating cam actuator which transmits approximately twice as much actuating force to one brake shoe as it does to the other brake shoe.

A further object is to provide in novel combination a crank member and a freely pivoted brake shoe actuator.

Another object resides in the provision of a novel brake shoe actuating cam having opposed sockets which pivotally receive brake shoe actuating push rods.

A further object is a novel disc cam construction comprising a body with end plates which restrain brake shoe actuating push rods in position in respective internal cam recesses in the body.

Another object resides in improved interchangeable shoe actuating push rods having brake shoe embracing portions at one end.

Additional objects and advantages of the invention will become apparent from the following description in conjunction with the accompanying drawings and the appended claims.

The drawings illustrate a suitable mechanical embodiment for purposes of disclosing the invention, are for purposes of illustration only and are not to be taken in a limited or restrictive sense, as it will be apparent to those skilled in the art that various changes in the illustrated embodiment may be resorted to without in any way exceeding the scope of the invention.

In the drawings:

Figure 2 is a partial sectioned view of the brake assembly along line 2—2 of Figure 1, which illustrates actuator and anchor details;

Figure 3 is a side detail view of a push rod; and

Figures 4 and 5 illustrate disc cam details.

Figure 1:
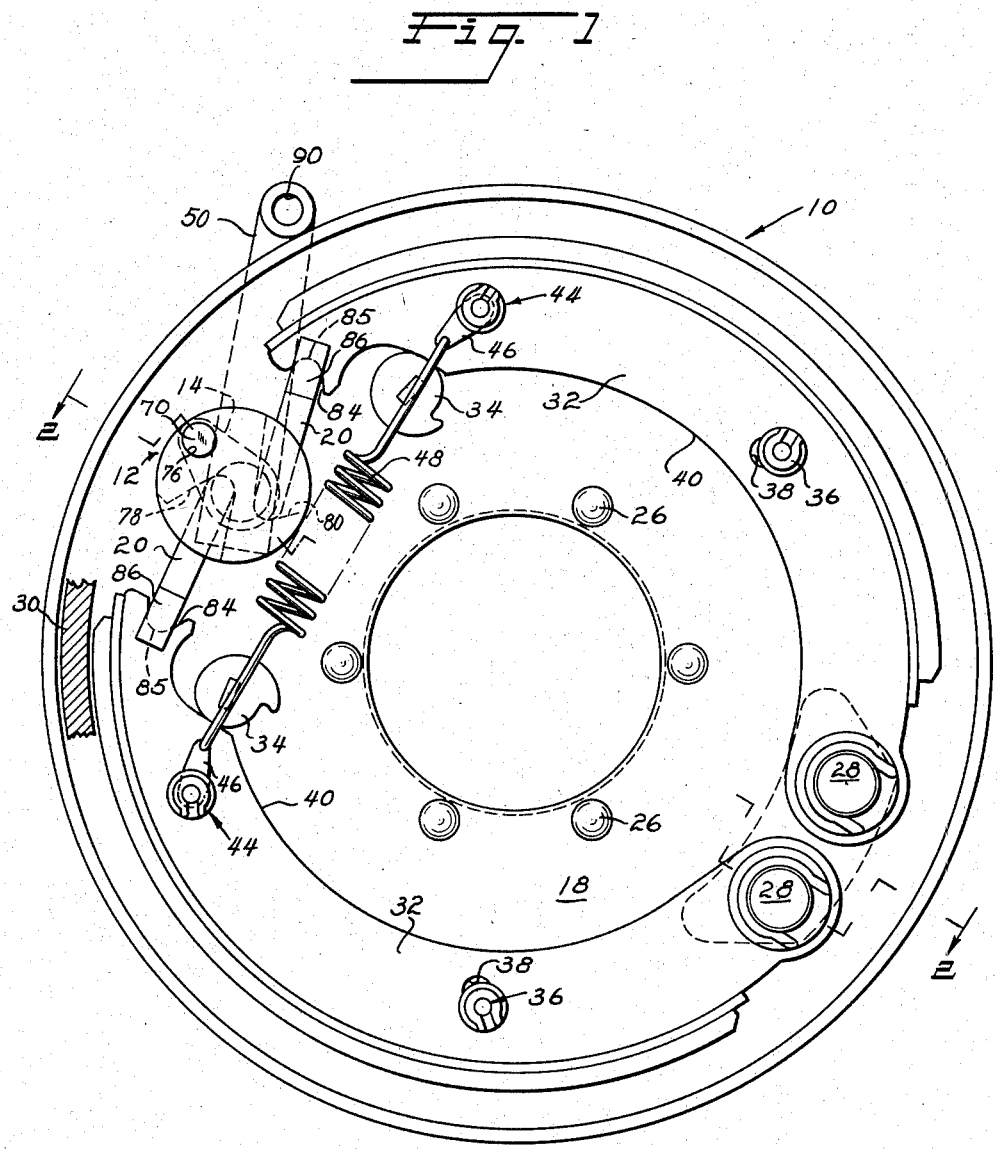
Figure 1 is a side elevational view of a brake assembly according to the preferred embodiment of the invention.

Referring now to the drawings and more particularly to Figure 1, the illustrated brake assembly 10 is generally conventional except for the improved flat disc cam actuator unit 12, the crank member 14, the crank support 16 mounted on backing plate 18, and the push rods 20 interconnecting the cam actuator unit with the ends of the brake shoes.

A conventional brake backing plate 18, which also serves as a dust shield for drum 30, is mounted on fixed flange 22 of axle 24 as by rivets at 26. Adjustable eccentric anchor pin assemblies 28, which may be the same as those disclosed in United States Letters Patent No. 2,435,955 to L. R. Buckendale et al., provide initial and wear adjustment for brake shoes 32 which are pivoted thereon at one end. Eccentric cams 34 which are conventional are rotatable for secondary brake shoe adjustments. Guide pin assemblies 36, which extend freely through enlarged openings 38 in the respective shoe webs 40, help maintain shoe alignment. Resiliently spring biased guide pins 44 also extend through enlarged openings 46 in the shoe webs and provide additional support for shoe alignment. Shoe return spring 48, which extends from opening 46 in one shoe web 40 to the corresponding opening 46 the other shoe web, returns the shoes 32 to non-braking position in abutment with the respective cams 34 when the actuating force transmitted through the cam actuator 12 is relaxed.

An actuating lever 50 is splined or otherwise non-rotatably mounted at 52 upon the inboard end shaft 53 of crank member 14. A bolt 54 carried by lever 50 cooperates with a groove 56 in shaft 53 to lock lever 50 axially in position on crank member 14. Crank support 16 is rigidly mounted on backing plate 18 as by welding. Grease may be introduced through a fixture in threaded opening 58 in the side of support 16 for lubricating the bearing section 60 of shaft 53. An oil seal 62 retained in the end of support 16 in abutting relation with lever 50 prevents loss of grease from the support. Crank member 14 is formed with an integral hub 64 where it passes through opening 68 in the backing plate, and a radial arm 66 extends from the hub. The outer end of arm 66 is formed with crank throw pin 70 which is cylindrical and parallel to shaft 53 and the axis of axle 24.

The cam actuator 12 (Figures 4 and 5) is an essentially disc-shaped assembly including a solid cam body 72 disposed between two end plates 74, the end plates and the cam body being permanently fastened together into a unit by any convenient means such as riveting or spot welding at 75. The cam actuator is provided with an eccentric bearing opening 76 passing through both the end plates 74 and cam body 72, and it is journalled freely thereby on crank pin 70 (Figures 1 and 2). Central cam body 72 is provided with two recesses 78 and 80 on opposite sides of a diametral line through the eccentric opening 76. The bottom of each recess 78 and 80 is curved and provides a pivot seat for the similarly rounded end 82 of a flat sided actuator rod 20. The bottom of each recess and the center of opening 76 are substantially diametrically aligned, with the bottom of recess 78 located approximately midway between opening 76 and the bottom of recess 80, as illustrated in Figure 4.

Cam body recesses 78 and 80 in conjunction with the two end plates 74 provide sockets in the periphery of the cam actuator unit 12, the socket forming portions of end plates 74 serving as socket side walls which effectively retain and prevent lateral rocking of the actuator rods 20. To positively prevent operative displacement of the rod from recess 80, which is closest to the peripheral margin of the disc actuator, opposed inwardly extending depressions 83 are provided in end plates 74, and effectively increase the side wall length of recess 80 (Figure 5).

The two brake shoes 32 are identical and are pivoted at adjacent ends by the aforementioned adjustable anchor pin assemblies 28. The other ends of the shoes 32 have curved bottom edge notches 84 provided in the shoe webs 40 to pivotally receive the outer curved ends 85 of actuator rods 20. As illustrated in Figure 3, the end 85 of each actuator rod 20 has rectangular tongue members 86 spot welded at 87 on each side of the rod with converging extensions 88 that bracket the sides of the shoe web 40 with a snug sliding fit.

Actuator rod tongue extensions 88 extend as a fork beyond the shoe notches 84 on each side of shoe webs 40 and maintain alignment and axial position of the floating actuator assembly 12 on the crank pin 70 by the cooperation of ends 82 within the recesses 78 and 80 and restrained between end plates 74.

As illustrated by Figure 1, lever 50 extends upwardly from the crank shaft so that actuating linkage (not shown) connected to the lever at opening 90 may actuate the brake by pulling lever 50 counterclockwise. If the disc cam actuator 12 were reversed 180° and crank throw pin 70 were positioned radially inward and recess 78 faced the upper shoe, an actuating lever 50 extending upward would actuate the brake when pulled counterclockwise.

In operation when lever 50 is pulled counterclockwise, as seen in Figure 1, the eccentric crank pin 70 moves counterclockwise in a circular arc about the center of crank shaft 53. As the bearing opening 76 of disc cam actuator 12 is so moved counterclockwise by pin 70, the bases of recesses 78 and 80 exert differential forces on the ends 82 of the respective push rods 20, to transmit different forces through the rods 20 to urge the brake shoes 32 toward the drum. This is effectively a force couple and, since the summation of forces about opening 76 or either abutment point of push rods 20 with disc cam 12 must equal zero, it is a dynamically balanced force couple.

In effect the crank 14 provides an operating eccentric and the actuator unit is a lever freely pivoted upon the eccentric pin 70, fulcrumed upon the rear brake shoe at socket 80 and applying the primary braking force to the forward or leading brake shoe (bottom shoe in Figure 1). This primary braking force coupled with the attendant self-energization produced when the brakes are applied with the drum rotating counterclockwise in Figure 1, provides a very substantial braking force between the leading shoe and the drum.

Actually the force exerted at recess 78, on a push rod 20, times the distance "O"–"A" along center line X—X from the center of opening 76 equals the force exerted at recess 80, on a push rod 20, times the distance "O"–"B" along center line X—X from the center of opening 76. The distance "O"–"A" is equal to one half the distance "O"–"B" so that the force at recess 78 is twice the force at recess 80. It is also true that the force exerted by pin 70 against a side of opening 76 plus the force at recess 80 against a push rod 20 equals the force at recess 78 against the other push rod 20. The floating arrangement of disc cam actuator 12 about pin 70 helps maintain actuator alignment and axial position and permits the actuator 12 to assume and maintain a dynamically balanced state whenever the lever 50 is operated for brake actuation.

In the embodiment of Figure 1 the disc cam actuator 12 is so assembled on crank member 14 so that the center actuator recess 78 faces the shoe subject to a self-energizing factor during the primary direction of brake drum rotation.

The actuating force transmitted to left hand shoe 32 of Figure 1 may be made smaller than that transmitted to the right hand shoe 32 to obtain more equalized braking pressures, by reversing the actuator 12 so the actuator recess 80 actuates the left hand brake shoe 32. The brake shoes which are identical may be reversed after a period of operation to obtain full lining wear on each shoe. Rods 20 are identical and interchangeable in the assembly.

From the foregoing it is apparent that there is hereby provided an improved vehicle brake assembly having a novel cam actuator unit and mode of operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In a brake having a pair of brake shoe assemblies pivoted upon means for urging said brake shoe assemblies toward each other, an actuator assembly operatively connected between the other ends of said shoe assemblies comprising a crank arm rotatably mounted upon a fixed axis on said support, a crank pin on said arm parallel to said axis, a cam member freely journalled on said pin, opposite edge sockets on said cam member with spaced apart essentially parallel side walls transverse to the axis of said bore, said sockets being disposed at different distances in the same direction from said pin, and motion transmitting rigid push rods having their opposite ends rockably mounted in and fitting said side walls of said sockets for confined movement in a path transverse to the axis of said bore and on the adjacent ends of the brake shoe assemblies; and means on the ends of said rods embracing and engaging said brake shoe assemblies and, with said rods and cam member sockets, axially maintaining said cam in position on said crank arm.

2. In a braket assembly for a highway vehicle of the type which normally moves forwardly characterized by a drum enclosing a pair of brake shoes pivoted at adjacent ends and resiliently urged toward each other at their other ends, an actuator disposed between said other ends of said shoes comprising: a power shaft journalled on a fixed axis; a crank rigid with said shaft providing a crank pin eccentric with respect to the shaft axis; a disc shaped lever member having an eccentric bore whereby said lever member is freely pivoted on said pin, said disc having two recessed oppositely disposed peripheral edge sockets providing deep seats with spaced apart essentially parallel side walls transverse to the axis of said bore, the bottoms of the seats of said sockets being differently spaced in the same direction from said bore and seat bottoms lying substantially on a disc diameter passing through the center of said bore; a first push rod rockably disposed in and fitting said side walls of one of said sockets of said lever member for confined movement in a path transverse to the axis of said bore, and embracing and rockably engaging said other end of the brake shoe which is subject to self-energization during forward movement of said vehicle; and a second push rod rockably disposed in and fitting said side walls of the other of said sockets on the opposite side of said lever member, which is at a greater distance from said crank pin than said first push rod, for confined movement in a path transverse to the axis of said bore and embracing and rockably engaging said other brake shoe, so that when said shaft is rotated to operatively expand the shoes toward the drum the lever is effectively fulcrumed on said second push rod and exerts an appreciably greater brake actuating force upon said shoe that is normally subject to self-energization.

3. A brake shoe actuator disc having an eccentric transverse through bore whereby said disc is adapted to be freely pivotally mounted on a brake actuator crank pin, said disc having two recessed oppositely disposed peripheral edge sockets providing deep seats with spaced apart essentially parallel side walls transverse to the axis of said bore, adapted to rockably engage the ends, and confine the rocking, of push rods extending from adjacent brake shoe ends to a path transverse of the axis of said bore, said sockets being differently spaced in the same direction from said bore and the bottoms of said seats lying substantially on a disc diameter passing through the center of said bore.

4. A brake shoe actuator disc as defined in claim 3, wherein said disc is an integral sandwich construction comprising a solid flat cam body core of essentially circular outline with an eccentric transverse aperture and two round bottom cutouts on opposite side edges of a diametral line of the core through said aperture, the bottoms of said cutouts being essentially on said diametral line; and a disc shaped plate disposed and rigidly secured on each side of said core, each disc shaped plate having an eccentric transverse aperture aligned with said core aperture, said cutouts and the overlying portions of said side plates constituting said deep seat sockets.

References Cited in the file of this patent

UNITED STATES PATENTS

| 1,753,208 | La Brie | Apr. 8, 1930 |
| 1,762,691 | La Brie | June 10, 1930 |
| 1,846,124 | La Brie | Feb. 23, 1932 |
| 1,862,309 | House | June 7, 1932 |
| 1,964,163 | La Brie | June 26, 1934 |
| 2,106,167 | Colman | Jan. 25, 1938 |
| 2,134,512 | Hall | Oct. 25, 1938 |

FOREIGN PATENTS

| 283,375 | Great Britain | Jan. 12, 1928 |
| 1,002,462 | France | Oct. 31, 1951 |

UNITED STATES PATENT OFFICE
CERTIFICATE OF CORRECTION

Patent No. 2,886,141           May 12, 1959

Bryan E. House

It is hereby certified that error appears in the printed specification of the above numbered patent requiring correction and that the said Letters Patent should read as corrected below.

Column 1, line 23, for "shroe" read -- shoe --; column 4, line 70, for "braket" read -- brake --.

Signed and sealed this 8th day of September 1959.

(SEAL)
Attest:

KARL H. AXLINE
Attesting Officer

ROBERT C. WATSON
Commissioner of Patents